United States Patent
Ajima

(10) Patent No.: US 10,424,808 B2
(45) Date of Patent: Sep. 24, 2019

(54) ELECTRODE ROLL AND MANUFACTURING METHOD FOR ELECTRODE ROLL

(71) Applicant: NEC ENERGY DEVICES, LTD., Sagamihara-shi, Kanagawa (JP)

(72) Inventor: Naruo Ajima, Kanagawa (JP)

(73) Assignee: Envision AESC Energy Devices, Ltd., Sagamihara-shi, Kanagawa (JP)

( * ) Notice: Subject to any disclaimer, the term of this patent is extended or adjusted under 35 U.S.C. 154(b) by 402 days.

(21) Appl. No.: 14/420,577

(22) PCT Filed: Aug. 7, 2013

(86) PCT No.: PCT/JP2013/071336
§ 371 (c)(1),
(2) Date: Feb. 9, 2015

(87) PCT Pub. No.: WO2014/041928
PCT Pub. Date: Mar. 20, 2014

(65) Prior Publication Data
US 2015/0200416 A1    Jul. 16, 2015

(30) Foreign Application Priority Data
Sep. 12, 2012  (JP) ................. 2012-200371

(51) Int. Cl.
*H01M 10/04*   (2006.01)
*H01M 10/0525*   (2010.01)
(Continued)

(52) U.S. Cl.
CPC ..... *H01M 10/0431* (2013.01); *H01M 4/0435* (2013.01); *H01M 4/139* (2013.01);
(Continued)

(58) Field of Classification Search
CPC ............ H01M 10/04; H01M 10/0431; H01M 10/0587; H01M 10/0525; H01M 10/05
See application file for complete search history.

(56) References Cited

U.S. PATENT DOCUMENTS

2009/0065426 A1    3/2009  Ishii et al.
2011/0300361 A1*  12/2011  Nakayama ............. C09J 7/0217
                                                  428/220

FOREIGN PATENT DOCUMENTS

CN    1348424 A    5/2002
CN    1640800 A    7/2005
(Continued)

OTHER PUBLICATIONS

Communication dated May 5, 2016, from the State Intellectual Property Office of People's Republic of China in counterpart application No. 201380047326.3.
(Continued)

*Primary Examiner* — Karie O'Neill Apicella
(74) *Attorney, Agent, or Firm* — Sughrue Mion, PLLC

(57) ABSTRACT

To provide an electrode roll capable of preventing lowering of production efficiency due to active material particles that have fallen. An electrode roll (600) in which a sheet-like electrode base material (500) which is subjected to cutting to be an electrode used for an electrochemical element is rolled, including a resin cylindrical member (200) having a peripheral surface (220) with a predetermined width, a flexible film (400) to be attached/detached with respect to the peripheral surface, and the sheet-like electrode base material (500) wound on the flexible film (400).

3 Claims, 4 Drawing Sheets

(51) Int. Cl.
*H01M 10/0587* (2010.01)
*H01M 10/05* (2010.01)
*H01M 4/04* (2006.01)
*H01M 4/139* (2010.01)
*H01M 4/88* (2006.01)

(52) U.S. Cl.
CPC ........... *H01M 4/88* (2013.01); *H01M 4/8803* (2013.01); *H01M 4/8896* (2013.01); *H01M 10/0525* (2013.01); *H01M 10/0587* (2013.01); *Y10T 29/49108* (2015.01); *Y10T 29/49112* (2015.01); *Y10T 29/49114* (2015.01)

(56) References Cited

FOREIGN PATENT DOCUMENTS

| CN | 101486850 A | | 7/2009 | |
|---|---|---|---|---|
| CN | 101501156 A | | 8/2009 | |
| CN | 101540418 A | * | 9/2009 | ............ H01M 10/40 |
| CN | 201397858 Y | | 2/2010 | |
| CN | 102079466 A | | 6/2011 | |
| CN | 201868529 U | * | 6/2011 | ........ H01M 10/0587 |
| CN | 102290607 A | | 12/2011 | |
| EP | 2 273 601 A1 | | 1/2011 | |
| JP | 63-228565 A | | 9/1988 | |
| JP | 11144763 A | | 5/1999 | |
| JP | 2000138076 A | | 5/2000 | |
| JP | 2000-345113 A | | 12/2000 | |
| JP | 2003-73036 A | | 3/2003 | |
| JP | 2003242970 A | | 8/2003 | |
| JP | 2005063780 A | | 3/2005 | |
| JP | 2005096810 A | | 4/2005 | |
| JP | 2005255225 A | | 9/2005 | |
| JP | 2008088271 A | | 4/2008 | |
| JP | 2009-224235 A | | 10/2009 | |
| JP | 2009-259747 A | | 11/2009 | |
| JP | 2012-54198 A | | 3/2012 | |
| JP | 2012188278 A | | 10/2012 | |
| KR | 1020070093713 A | | 9/2007 | |
| WO | 2005/015667 A2 | | 2/2005 | |

OTHER PUBLICATIONS

Communication dated Apr. 20, 2016, issued by the European Patent Office in corresponding European Application No. 13837998.7.
International Search Report for PCT/JP2013/071336 dated Sep. 24, 2013.
Communication dated Jul. 14, 2017 from the State Intellectual Property Office of the P.R.C., in counterpart Chinese application No. 201380047326.3.
Communication dated Jun. 20, 2018 from the Japanese Patent Office in counterpart Japanese application No. 2017-151707.

* cited by examiner

ELECTRODE ROLL AND MANUFACTURING METHOD FOR ELECTRODE ROLL

CROSS REFERENCE TO RELATED APPLICATIONS

This application is a National Stage of International Application No. PCT/JP2013/071336 filed Aug. 7, 2013, claiming priority based on Japanese Patent Application No. 2012-200371 filed Sep. 12, 2012, the contents of all of which are incorporated herein by reference in their entirety.

TECHNICAL FIELD

The present invention relates to an electrode roll used for manufacturing of a secondary unit battery such as a lithium ion battery and a manufacturing method thereof.

BACKGROUND ART

Recently, as a solution for environmental problems, clean energy which can be obtained by wind power generation, solar power generation, or the like and can be used for household uses (for detached houses, etc.) or for industrial uses (for transport equipment, construction equipment, etc.) is attracting attention. However, the clean energy has a disadvantage in that output variation becomes large depending on the situation. For example, energy by the solar power generation can be obtained in the daytime where the sun is shining, while it cannot be obtained at night where the sun is down.

To stabilize the output of the clean energy, technology that temporarily stores the clean energy in a battery is used. For example, solar energy thus stored in the battery becomes available at night where the sun is down. In general, a lead battery has been used as a battery for storing the clean energy; however, the lead battery has a disadvantage in that it is generally large in size and low in energy density.

Thus, recently, a lithium ion secondary battery capable of operating at normal temperature and having a high energy density is attracting attention. In addition to the high energy density, the lithium ion secondary battery has a low impedance and is thus excellent in responsiveness.

As an example of an internal structure of such a lithium ion secondary battery, there is known a structure in which an electrode laminate obtained by laminating a plurality of sheet-like positive electrodes and a plurality of sheet-like negative electrodes through separators and electrolyte are housed in a laminate film exterior material having a rectangular shape in a plan view (refer to, e.g., Patent Document 1).

PATENT DOCUMENT 1

JP2012-54198A

DISCLOSURE OF THE INVENTION

Problems to be Solved by the Invention

The sheet-like positive electrode or sheet-like negative electrode is cut out from a long sheet member (sheet-like electrode base material) serving as a base material thereof. The sheet-like electrode base material has an area larger than that of the sheet-like positive electrode or sheet-like negative electrode and has a predetermined width.

The above sheet-like electrode base material is prepared in a state of being wound around a cylindrical member when being subjected to cut-out process.

For example, a sheet-like electrode base material for positive electrode is obtained by applying a positive electrode active material composed of lithium manganate to both front and back surfaces of an aluminum base material. Here there is a problem in that while a sheet-like electrode base material having a width smaller than a width of the cylindrical member is wound around the cylindrical member or while the sheet-like electrode base material is delivered from the cylindrical member, particles of the positive electrode active material falling from the sheet-like electrode base material may be adhered to the cylindrical member.

The cylindrical member is repeatedly used, so that if the active material particles are adhered to the cylindrical member, they may be drawn in the sheet-like electrode base material by static electricity or vibration next time when the sheet-like electrode base material is wound around the cylindrical member. When the sheet-like electrode base material is wound while pressing the active material particles, the following problems may occur: shapes of the active material particles are transferred onto the sheet-like electrode base material; the sheet-like electrode base material is subjected to lamination for formation of a battery with the active material adhered thereto; and the sheet-like electrode base material is damaged by the active material particles. As a result, the number of conforming articles of the electrode that can be cut out from the sheet-like electrode base material is reduced, thus deteriorating production efficiency.

Means for Solving the Problems

The present invention has been made to solve the above problem, and an electrode roll according to the present invention is an electrode roll in which a sheet-like electrode base material which is subjected to cutting to be an electrode used for an electrochemical element is rolled, including a resin cylindrical member having a peripheral surface with a predetermined width, a flexible film to be attached/detached with respect to the peripheral surface, and the sheet-like electrode base material wound on the flexible film.

In the electrode roll according to the present invention, the flexible film is fixed onto the peripheral surface by a double-side tape.

In the electrode roll according to the present invention, front and back adhesive layers of the double-sided tape have different adhesive strengths, and the adhesive layer having a lower adhesive strength is brought into contact with the peripheral surface.

A manufacturing method according to the present invention is a manufacturing method for an electrode roll which is a sheet-like electrode base material which is subjected to cutting to be an electrode used for an electrochemical element and includes an attachment step of attaching a flexible film to a peripheral surface of a resin cylindrical member, the peripheral surface having a predetermined width, and a winding step of winding the sheet-like electrode base material on the flexible film.

In the electrode roll manufacturing method according to the present invention, in the attachment step, the flexible film is fixed onto the peripheral surface by a double-side tape.

In the electrode roll manufacturing method according to the present invention, front and back adhesive layers of the double-sided tape have different adhesive strengths, and the adhesive layer having a lower adhesive strength is brought into contact with the peripheral surface.

Advantages of the Invention

According to the electrode roll of the present invention, the flexible film is detachably provided on the peripheral surface of the cylindrical member. Thus, even when particles of the positive electrode active material fall from the sheet-like electrode base material, it is possible to prevent, by replacing the flexible film with a new one, a problem in that shapes of the active material particles that have fallen are transferred onto the sheet-like electrode base material when the sheet-like electrode base material is wound around the cylindrical member, or sheet-like electrode base material is damaged by the active material particles, thereby improving production efficiency.

Further, according to the electrode roll manufacturing method of the present invention, there can be provided the electrode roll from which it is possible to manufacture a battery having stable electric characteristics and excellent in reliability while preventing shapes of the active material particles that have fallen from being transferred onto the sheet-like electrode base material or preventing the sheet-like electrode base material from being damaged by the active material particles.

BEST MODE FOR CARRYING OUT THE INVENTION

Figure 1:
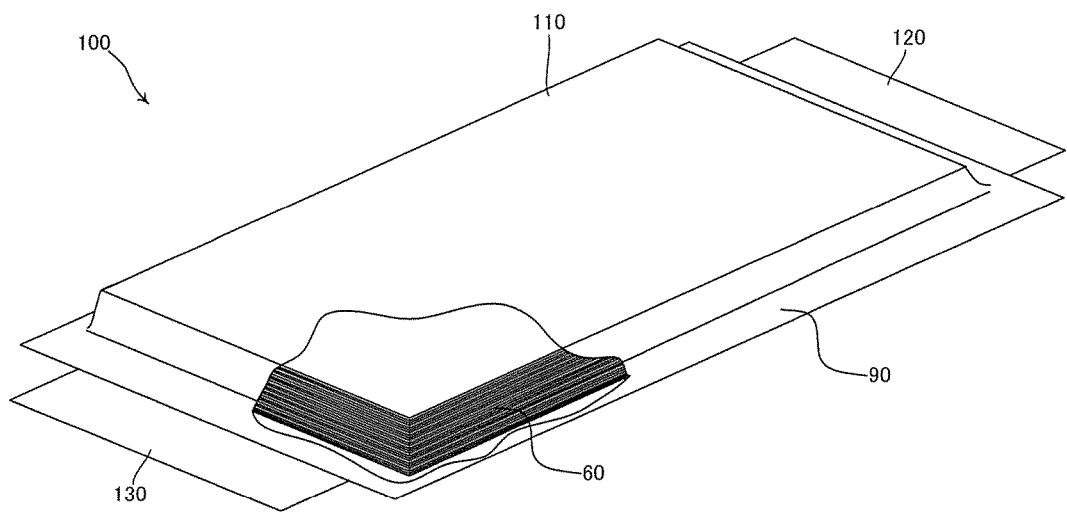
FIG. 1 is a view explaining an internal structure of a unit battery 100 manufactured using an electrode roll 600 according to an embodiment of the present invention.

An embodiment of the present invention will be described below with reference to the drawings. FIG. 1 is a view explaining an internal structure of a unit battery 100 manufactured using an electrode roll according to the embodiment of the present invention.

In the present embodiment, as the unit battery 100, a lithium ion secondary battery as a kind of an electrochemical element, in which lithium ion is moved between positive and negative electrode to perform charging and discharging is used.

FIG. 1 is a perspective view illustrating the unit battery 100 in a partially transparent manner.

A battery body 110 of the unit battery 100 has a structure in which an electrode laminate 60 obtained by laminating a plurality of sheet-like positive electrodes and a plurality of sheet-like negative electrodes through separators and electrolyte (not illustrated) are housed in a laminate film exterior material 90 having a rectangular shape in a plan view.

The sheet-like positive electrodes are each conductively connected to a positive electrode lead-out tab 120 through a not illustrated collector. Similarly, the sheet-like negative electrodes are each conductively connected to a negative electrode lead-out tab 130 through a not illustrated collector.

The positive electrode lead-out tab 120 and the negative electrode lead-out tab 130 are drawn, respectively, from one end portion (side) of the battery body 110 and the other end portion (side) opposite to the one end portion.

The positive electrode lead-out tab 120 and the negative electrode lead-out tab 130 each have a planar shape and are connected, inside the laminate film exterior material 90, to the sheet-like positive electrodes and the sheet-like negative electrodes, respectively, directly or through a collector.

The laminate film exterior material 90 is constituted by a metal laminate film having a heat sealing resin layer. More specifically, for example, two metal laminate film are put one over the other with the heat sealing resin layers facing each other to form the laminate film exterior material 90, and an outer periphery of the laminate film exterior material 90 is heat-sealed with the electrode laminate 60 including the sheet-like positive electrodes, sheet-like negative electrodes, and separators and electrolyte housed inside the laminate film exterior material 90, whereby the laminate film exterior material 90 is internally hermetically sealed.

Here, a metal piece such as the positive electrode lead-out tab 120 or the negative electrode lead-out tab 130 drawn from the battery body 110 including the laminate film exterior material 90 is referred to as "lead-out tab", and the sheet-like positive electrode or the sheet-like negative electrode laminated to each other through the separators inside the laminate film exterior material 90 is referred to as "electrode".

The electrode laminate 60 includes, in addition to the above electrode laminate obtained by laminating the plurality of sheet-like positive electrodes and plurality of sheet-like negative electrodes through the separators, an electrode laminate obtained by rolling and compressing a laminated body obtained by laminating the plurality of sheet-like positive electrodes and plurality of sheet-like negative electrodes through the separators.

Generally, in the unit battery 100 as described above, aluminum or an aluminum alloy is used as a material of the positive electrode lead-out tab 120; and nickel, a material (nickel plating material (e.g., nickel-plated copper)) obtained by applying nickel-plating to metal other than the nickel, or a clad (nickel clad material (e.g., nickel-copper clad)) of nickel and metal other than the nickel is used as a material of the negative electrode lead-out tab 130. In the present embodiment, the positive electrode lead-out tab 120 is made of aluminum, and the negative electrode lead-out tab 130 is made of nickel-plated copper.

The following describes an electrode roll 600 used in manufacturing process of the above unit battery 100.

The electrode roll 600 is obtained by winding, in a roll shape, a sheet-like electrode base material 500 serving as a base material from which the sheet-like positive or negative electrode used for the unit battery 100 is cut out. The sheet-like electrode base material 500 has an area larger than that of the individual sheet-like positive or negative electrode and has a predetermined width. A cylindrical member 200 is used for winding the sheet-like electrode base material 500. The electrode roll in the present invention refers to a body including not only the sheet-like electrode, but also the cylindrical member.

Figure 2:
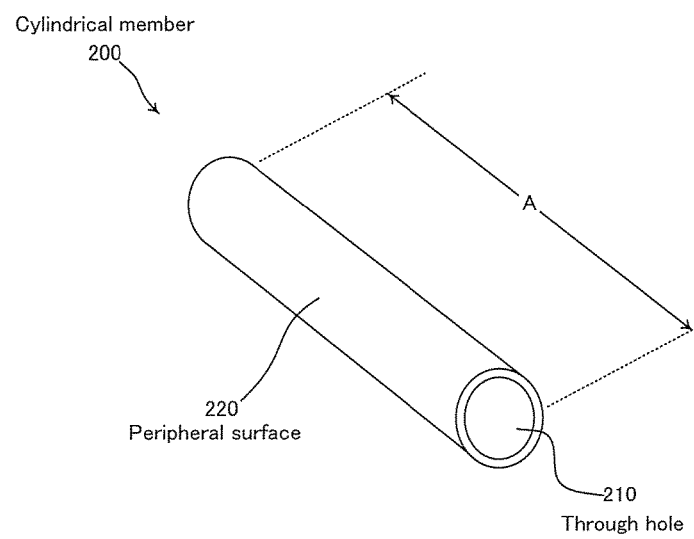
FIG. 2 is a view explaining a cylindrical member 200 used for the electrode roll 600 according to the embodiment of the present invention.

FIG. 2 is a view explaining the cylindrical member 200 used for the electrode roll 600 according to the embodiment of the present invention.

The cylindrical member 200 is a member formed into a cylindrical shape having a through hole 210 as illustrated. A material of the cylindrical member 200 is not especially limited as long as the cylindrical member 200 has a predetermined strength that resists deformation when the electrode is wound therearound under a tension and may be a metal, such as aluminum or a stainless steel, resin such as ABS or polycarbonate, plastic, paper, a material obtained by combining them or mixing fabrics. Among them, the resin or a reinforced plastic is preferable in terms of weight and strength and, for example, the cylindrical member 200 may be suitably formed of ABS resin. A width A of a peripheral surface 220 of the cylindrical member 200 around which the sheet-like electrode base material 500 is wound may be arbitrarily set.

For example, the width A of the peripheral surface 220, an outer diameter of the cylindrical member 200, and an inner diameter of the through hole 210 may be set to 800 mm, 180 mmφ, and 150 mmφ, respectively.

The sheet-like electrode base material 500 having a width smaller than the width A of the peripheral surface 220 is wound around the thus configured cylindrical member 200, whereby the electrode roll is obtained.

The cylindrical member 200 is repeatedly used, so that if the active material particles are adhered to the cylindrical member 200, they may be drawn in the sheet-like electrode base material 500 next time when the sheet-like electrode base material 500 is wound around the cylindrical member 200. When the sheet-like electrode base material 500 is wound while pressing the active material particles, the following problems may occur: shapes of the active material particles are transferred onto the sheet-like electrode base material 500; the active material particles are adhered to the sheet-like electrode base material 500; and the sheet-like electrode base material 500 is damaged by the active material particles.

To prevent this, in the electrode roll 600 according to the present invention, a removable flexible film 400 is provided on the peripheral surface 220 of the cylindrical member 200, and then the sheet-like electrode base material 500 is wound on the removable flexible film 400.

Thus, in the present invention, when the active material particles are adhered to the flexible film 400 during repeated use of the cylindrical member 200, a part of the flexible film that corresponds to active material adhered portion is removed to expose a flexible film surface onto which the active material is not adhered, or the flexible film 400 itself is replaced with a new one.

Figure 3:
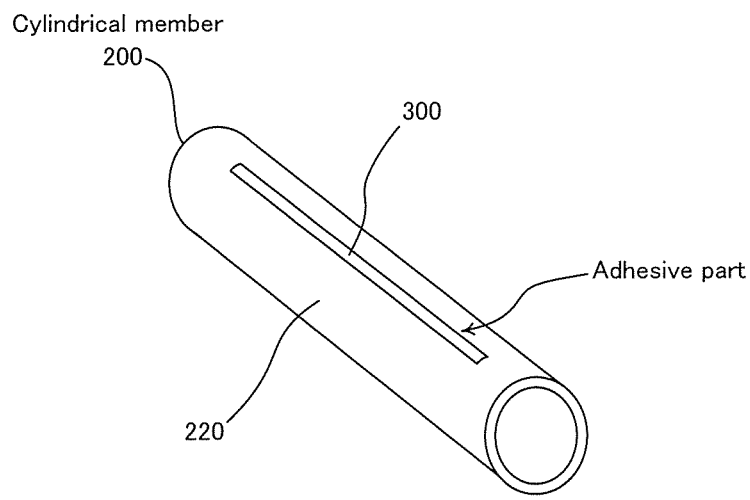
FIG. 3 is a view illustrating a manufacturing process of the electrode roll 600 according to the embodiment of the present invention.

FIG. 3 is a view illustrating a manufacturing process of the electrode roll 600 according to the embodiment of the present invention. As illustrated in FIG. 3, before providing the removable flexible film 400 on the peripheral surface 220 of the cylindrical member 200, an adhesive portion for fixing the flexible film 400 to the cylindrical member 200 is provided in a width direction of the cylindrical member 200. The adhesive portion may be realized by application of a pasty material or double-sided tape. In terms of handling property to be described later, a double-sided tape 300 is preferably used. A dimension of the double-sided tape 300 is not especially limited as long as the flexible film can be fixed. For example, a length in the direction of the width A of the cylindrical member may be set to about 500 mm to 600 mm, and a tape width in a circumferential direction may be set to about 20 mm.

Figure 4:
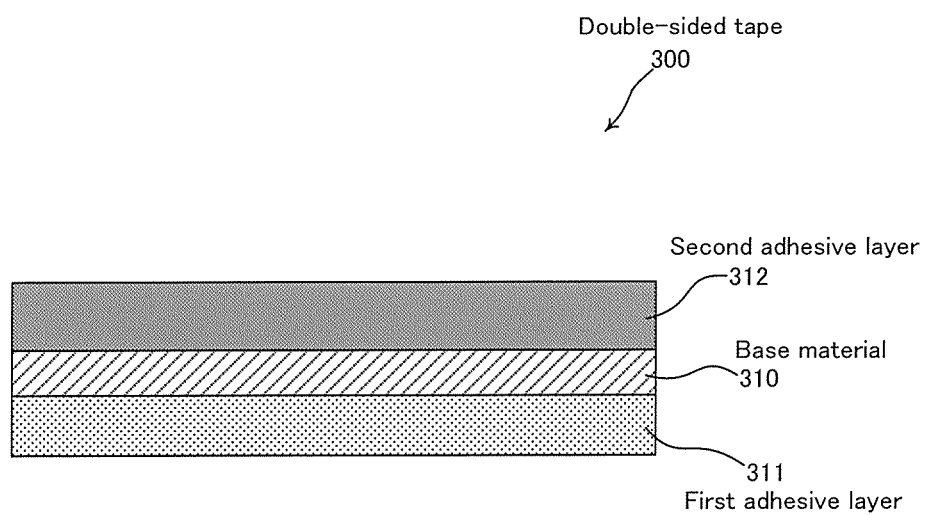
FIG. 4 is a view schematically illustrating a cross section of a double-sided tape 300 used for the electrode roll 600 according to the embodiment of the present invention.

Front and back adhesive layers of the double-side tape 300 used in manufacturing of the electrode roll 600 preferably have different adhesive strengths. FIG. 4 is a view schematically illustrating a cross section of the double-sided tape 300 used for the electrode roll 600 according to the embodiment of the present invention.

The double-sided tape 300 includes a base material 310, a first adhesive layer 311, and a second adhesive layer 312. The base material is formed of PET, and first and second adhesive layers 311 and 312 are formed of acrylic adhesive applied onto front and back surfaces of the base material 310. The first and second adhesive layers 311 and 312 have different adhesive strengths. For example, when the first adhesive layer 311 is lower in adhesive strength than the second adhesive layer 312, the flexible film 400 is provided on the periphery of the cylindrical member 200 with the first adhesive layer 311 having a lower adhesive strength contacting the peripheral surface 220 of the cylindrical member 200 and second adhesive layer 312 having a higher adhesive strength contacting the flexible film 400.

With the above configuration, the double-sided tape 300 is easily peeled off from the peripheral surface 220 of the cylindrical member 200, thereby enhancing replaceability of the flexible film 400. Further, it is possible to eliminate disadvantage that a component of the first adhesive layer 311 remains on the peripheral surface 220 of the cylindrical member 200 when the double-sided tape 300 is peeled off from the peripheral surface 220 of the cylindrical member 200.

The flexible film. 400 may be formed of, e.g., paper, metal, resin, plastic, or the like and formed into a sheet of a thickness of about 5 μm to 1 mm. Considering dust-proof performance or handleability, it is preferable that a PET film is used as the flexible film 400 and that the thickness thereof is set to about 50 μm to 250 μm. As a dimension of the flexible film 400, a length in a width direction of the cylindrical member is preferably equal to or less than the width A of the cylindrical member, and a length in a circumferential direction of the cylindrical member is equal to or more than the circumferential length of the cylindrical member. Assuming that the width A of the peripheral surface 220 of the cylindrical member is 800 mm and that the outer diameter thereof is φ180, a 700 mm×700 mm flexible film may be used.

Figure 5:
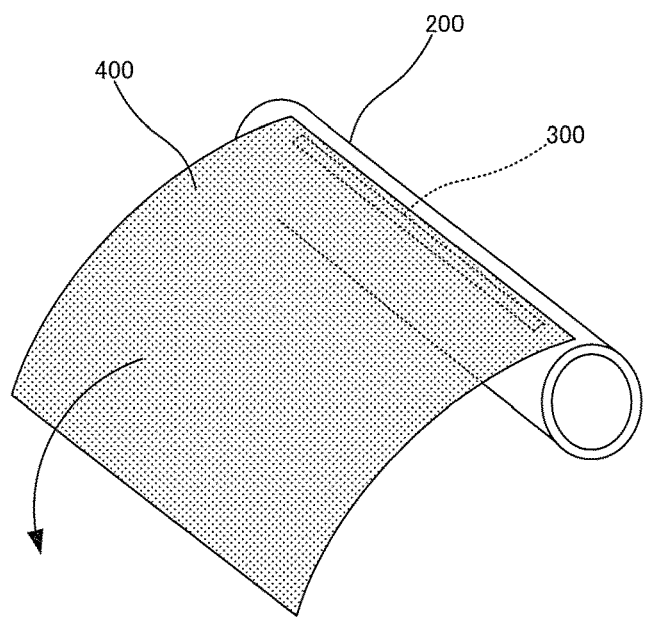
FIG. 5 is a view illustrating a manufacturing process of the electrode roll 600 according to the embodiment of the present invention.
Figure 6:
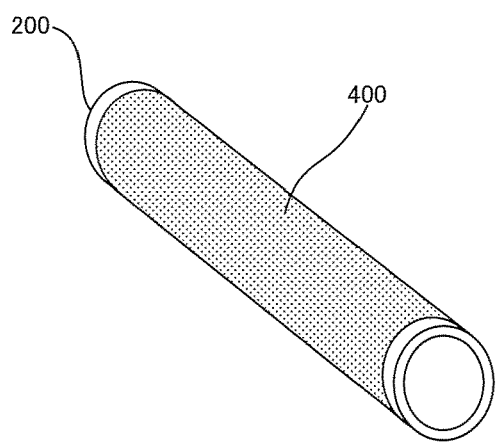
FIG. 6 is a view illustrating a manufacturing process of the electrode roll 600 according to the embodiment of the present invention.

The first adhesive layer 311 of the double-sided tape 300 is stuck to the peripheral surface 220, and the second adhesive layer 312 is stuck to the flexible film 400. Then, as illustrated in FIG. 5, the flexible film 400 is wound around the cylindrical member 200 by one or more turns, and a state illustrated in FIG. 6 is obtained, whereby preparation of winding the sheet-like electrode base material 500 around the cylindrical member 200 is completed.

Taking the positive electrode as an example, the sheet-like electrode base material 500 to be wound around the cylindrical member 200 is manufactured as follows.

First, a composite material of lithium manganate and lithium nickelate as the positive electrode active material, carbon black as a conductive agent, polyvinylidene fluoride as a binder, and N-methyl-2-pyrrolidone (NMP) solution as a solvent are mixed to prepare a positive electrode slurry.

The thus prepared positive electrode slurry is intermittently or continuously applied onto both surfaces of an aluminum foil (thickness: 20 μm) as a positive electrode collector, followed by heating to remove the solvent, followed by pressuring with a roller so as to make the thickness of the sheet-like electrode base material 500 for positive electrode be about 200 μm.

On the other hand, in the case of the sheet-like electrode base material 500 for negative electrode, graphite powder as the negative electrode active material, polyvinylidene fluoride as a binder, and NMP solution as a solvent are mixed to prepare a negative electrode slurry. Then, the prepared negative electrode slurry is intermittently or continuously applied onto both surfaces of a copper foil as a negative electrode collector, followed by heating to remove the solvent, followed by pressuring with a roller.

In the present invention, both the sheet-like electrode base material 500 for positive electrode and that for negative electrode can be used as the sheet-like electrode base material 500 to be wound around the electrode roll 600.

Figure 7:
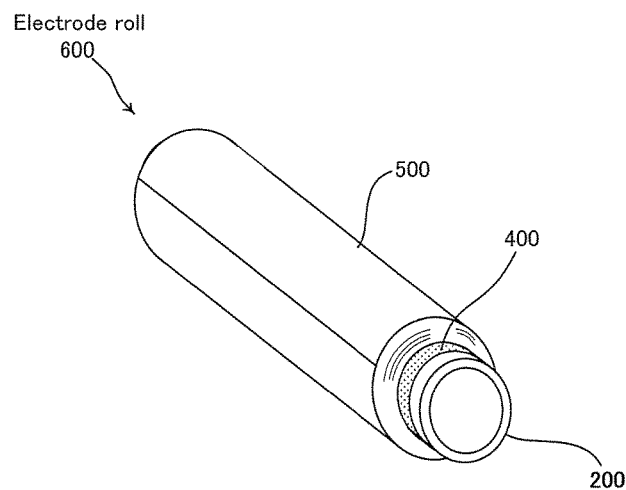
FIG. 7 is a view illustrating the electrode roll 600 according to the embodiment of the present invention.

FIG. 7 illustrates the electrode roll 600 according to the present invention obtained by winding the thus manufactured sheet-like electrode base material 500 around the cylindrical member 200.

Figure 8:
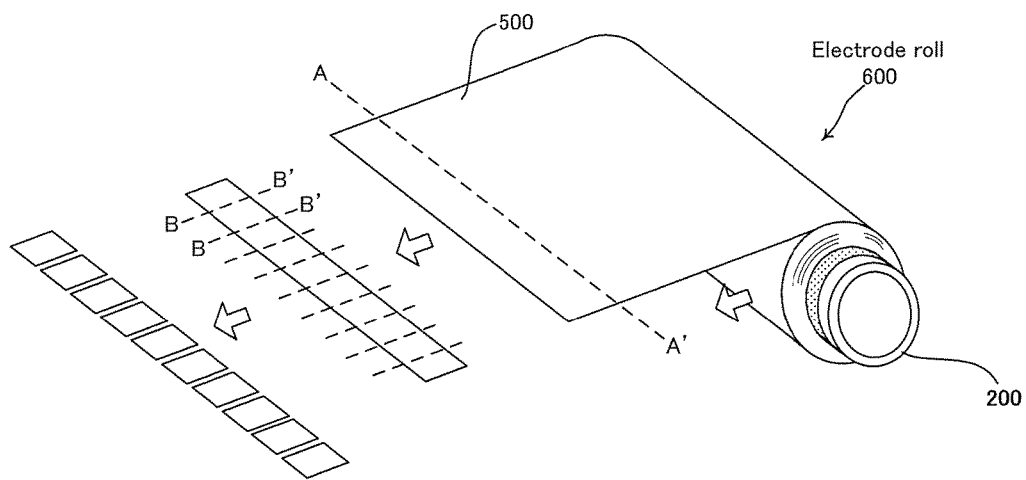
FIG. 8 is a view explaining a process of cutting a sheet-like electrode from the electrode roll 600 according to the embodiment of the present invention.

The electrode roll 600 thus obtained is attached to a not illustrated delivery device and a not illustrated cutting device. Then, for example, as illustrated in FIG. 8, the sheet-like electrode base material 500 is cut along a line A-A' while being drawn in a direction of an arrow, followed by cutting along lines B-B', whereby the plurality of the sheet-like positive electrodes and plurality of the sheet-like negative electrodes used for the electrode laminate 60 of the unit battery 100 can be obtained. Alternatively, to obtain the plurality of sheet-like positive electrodes and plurality of sheet-like negative electrodes, processing may be performed in which the sheet-like electrode base material 500 is cut along the B-B' line in a longitudinal direction thereof, followed by cutting along the A-A' line.

According to the electrode roll 600 of the present invention, the flexible film 400 is detachably provided on the peripheral surface 220 of the cylindrical member 200. Thus, even when particles of the positive electrode active material fall from the sheet-like electrode base material 500, it is possible to prevent a problem in that shapes of the active material particles that have fallen are transferred onto the sheet-like electrode base material 500 when the sheet-like electrode base material 500 is wound around the cylindrical member 200 to form irregularities in the active material, the adhered active material remaining on the sheet-like electrode base material 500, or sheet-like electrode base material 500 is damaged by the active material particles by removing a part of the flexible film 400 that corresponds to active material adhered portion to expose a flexible film surface onto which the active material is not adhered, or by replacing the flexible film 400 itself with a new one, thus providing an electrode roll manufacturing method capable of improving production efficiency.

In the present invention, the double-sided tape 300 or flexible film 400 is stuck to the cylindrical member 200 and, thereby, a level difference is caused. However, the level difference is constant in both the width and length directions of the sheet-like base material, so that, unlike a local level difference caused due to foreign matters, it can be alleviated by winding a collector foil having no electrode active material on the innermost peripheral side of the electrode roll by one or more turns, thereby preventing adverse effect on battery characteristics or reliability.

Further, according to the manufacturing method of the electrode roll 600 of the present invention, there can be provided the electrode roll 600 from which it is possible to manufacture a battery having stable electric characteristics and excellent in reliability while preventing shapes of the active material particles that have fallen from being transferred onto the sheet-like electrode base material 500 or preventing the sheet-like electrode base material 500 from being damaged by the active material particles.

INDUSTRIAL APPLICABILITY

According to the electrode roll of the present invention, even when the active material particles fall from the sheet-like electrode material, adverse effect caused by the particles can be eliminated by replacing the detachable flexible film with a new one, thereby improving production efficiency. Thus, the industrial applicability of the present invention is considerable.

REFERENCE SIGNS LIST

60: Electrode laminate
90: Laminate film exterior material
100: Unit battery
110: Battery main body
120: Positive electrode lead-out tab
130: Negative electrode lead-out tab
200: Cylindrical member
210: Through hole
220: Peripheral surface
300: Double-side tape
310: Base material
311: First adhesive layer
312: Second adhesive layer
400: Flexible film
500: Sheet-like electrode base material
600: Electrode roll

The invention claimed is:

1. A manufacturing method for an electrode roll by which a sheet-like electrode base material that comprises either positive electrode active material or negative electrode active material is rolled, the manufacturing method comprising:
    attaching a flexible film to a peripheral surface of a resin cylindrical member, the peripheral surface having a predetermined width; and
    winding the sheet-like electrode base material that comprises either the positive electrode active material or the negative electrode active material on the flexible film,
    wherein when either the positive electrode active material or the negative electrode active material adheres to a portion of the flexible film, the portion of the flexible film on which the positive electrode active material or the negative electrode active material is adhered to is removed to expose a flexible film surface onto which the positive electrode active material and the negative electrode active material are not adhered, or the flexible film itself is replaced with a new flexible film, and
    wherein the resin cylindrical member is used repeatedly.

2. The electrode roll manufacturing method according to claim 1, wherein further
    the flexible film is fixed onto the peripheral surface by a double-side tape.

3. The electrode roll manufacturing method according to claim 2, wherein front and back adhesive layers of the double-sided tape have different adhesive strengths, and the adhesive layer having a lower adhesive strength is brought into contact with the peripheral surface.

* * * * *